(12) United States Patent
Pasca (10) Patent No.: US 10,671,345 B2
(45) Date of Patent: Jun. 2, 2020

(54) METHODS AND APPARATUS FOR PERFORMING FIXED-POINT NORMALIZATION USING FLOATING-POINT FUNCTIONAL BLOCKS

(71) Applicant: Intel Corporation, Santa Clara, CA (US)

(72) Inventor: Bogdan Pasca, Chesham (GB)

(73) Assignee: Intel Corporation, San Jose, CA (US)

( * ) Notice: Subject to any disclaimer, the term of this patent is extended or adjusted under 35 U.S.C. 154(b) by 0 days.

(21) Appl. No.: 15/422,966

(22) Filed: Feb. 2, 2017

(65) Prior Publication Data

US 2018/0217811 A1    Aug. 2, 2018

(51) Int. Cl.
*G06F 5/01*    (2006.01)
*G06F 7/483*    (2006.01)
*G06F 7/499*    (2006.01)

(52) U.S. Cl.
CPC .............. *G06F 5/012* (2013.01); *G06F 7/483* (2013.01); *G06F 7/49936* (2013.01); *G06F 2205/00* (2013.01)

(58) Field of Classification Search
CPC ...................................................... G06F 7/499
See application file for complete search history.

(56) References Cited

U.S. PATENT DOCUMENTS

| | | | |
|---|---|---|---|
| 5,757,687 A | 5/1998 | Naffziger et al. | |
| 6,148,314 A | 11/2000 | Matheny et al. | |
| 7,546,328 B2 | 6/2009 | Schulte et al. | |
| 9,400,635 B1 | 7/2016 | Czajkowski | |
| 2009/0083358 A1* | 3/2009 | Allen | G06F 9/45504 708/495 |
| 2012/0311009 A1 | 12/2012 | Jarrett et al. | |
| 2014/0195581 A1 | 7/2014 | Wilkins | |

(Continued)

FOREIGN PATENT DOCUMENTS

| | | |
|---|---|---|
| EP | 0298717 A2 | 1/1989 |
| EP | 0800133 A1 | 10/1997 |

OTHER PUBLICATIONS

K. Scott Hemmert et al., Fast Efficient Floating-Point Adders and Multipliers for FPGAs, ACM Transactions on Reconfigurable Technology and Systems, vol. 3, No. 3, Article 11, p. 1-29 (2010) (Year: 2010).*

(Continued)

*Primary Examiner* — Andrew Caldwell
*Assistant Examiner* — Emily E Larocque
(74) *Attorney, Agent, or Firm* — Treyz Law Group, P.C.; Jason Tsai (57) ABSTRACT

An integrated circuit may include normalization circuitry that can be used when converting a fixed-point number to a floating-point number. The normalization circuitry may include at least a floating-point generation circuit that receives the fixed-point number and that creates a corresponding floating-point number. The normalization circuitry may then leverage an embedded digital signal processing (DSP) block on the integrated circuit to perform an arithmetic operation by removing the leading one from the created floating-point number. The resulting number may have a fractional component and an exponent value, which can then be used to derive the final normalized value.

18 Claims, 6 Drawing Sheets

(56) References Cited

U.S. PATENT DOCUMENTS

2018/0157464 A1* 6/2018 Lutz ........................ G06F 7/483

OTHER PUBLICATIONS

M. Langhammer et al, Design and Implementation of an Embedded FPGA Floating Point DSP Block, 2015 IEEE 22nd Symposium on Computer Arithmetic, IEEE Computer Society, p. 26-33 (2015) (Year: 2015).*
M. Langhammer, et al., Floating-Point DSP Block Architecture for FPGAs, FPGA '15, ACM p. 117-125 (2015) (Year: 2015).*
Martin S. Schmookler et al., Leading Zero Anticipation and Detection—A Comparison of Methods, Proceedings 15th IEEE Symposium on Computer Arithmetic, Jun. 11-13, 2001, p. 7-12, IEEE, Los Alamitos, CA, United States.
Nebojsa Z. Milenkovic et al., Modular Design of Fast Leading Zeros Counting Circuit, Journal of Electrical Engineering, Jan. 1, 2015, vol. 66, No. 6, De Gruyter, Berlin, Germany.

* cited by examiner

METHODS AND APPARATUS FOR PERFORMING FIXED-POINT NORMALIZATION USING FLOATING-POINT FUNCTIONAL BLOCKS

BACKGROUND

This invention relates to integrated circuit and, more particularly, to integrated circuits that are capable of performing floating-point arithmetic operations.

Floating-point operations are usually implemented in accordance with the IEEE754 standard, which defines a nonsubnormal floating-point number as consisting of a sign, a mantissa, and an exponent, where the mantissa is required to be normalized at all times because the standard implies a leading "1" (whereas subnormal numbers have all zero exponent bits with no implied one). Conventionally, normalization is performed using leading-zero counters and barrel shifters (i.e., circuits for left-shifting a number to be normalized by the number of zeros). However, performing normalization in this way is expensive in terms of circuit area and operational latency.

Integrated circuit such as programmable integrated circuits often include soft logic circuitry for implementing the leading-zero counters and the barrel shifters. In particular, the barrel shifters are typically implemented using a network of multiplexers. It may, however, be difficult to introduce additional pipeline stages into the network of multiplexers, which can limit the overall performance of the integrated circuit. It may therefore be desirable to shift the implementation of the normalization circuit into embedded hard logic resources that can be more easily pipelined.

It is within this context that the embodiments herein arise.

SUMMARY

An integrated circuit that includes normalization circuitry is provided. The normalization circuitry may receive a fixed-point number and output a corresponding normalized version of the fixed-point number along with an associated count value. The count value may represent the number of leading zeros in the pre-normalized fixed-point number.

In one suitable arrangement, the normalization circuitry may include a mantissa generation circuit that receives the fixed-point number and that generates a mantissa for a floating-point number by inserting a leading one in front of the fixed-point number and by optionally right padding the fixed-point number with zeros. The normalization circuitry may also include a floating-point generation circuit that creates the floating-point number using predetermined exponent and sign values and a specialized processing block (e.g., a digital signal processing or "DSP" block) that computes a difference between the floating-point number and a constant. The constant may have a mantissa that is equal to "1.0" and an exponent and sign bit that are equal to those of the floating-point number.

The normalization circuitry may further include a reducing OR circuit that receives the exponent of the difference and that generates the MSB for the normalized number, a subtraction circuit that receives the exponent of the floating-point number and the exponent of the difference and that generates an output, and a multiplexer that receives the width of the fixed-point number, the output from the subtraction circuit, and that is controlled by the MSB to generate the count value.

In another suitable arrangement, the normalization circuitry may further include a second mantissa generation circuitry that receives a different subset of the fixed-point number and that generates another mantissa for a second floating-point number. The normalization circuitry may also include a second floating-point generation circuit that creates the second floating-point number and a second DSP block. The two DSP blocks may be coupled in series. A first of the DSP blocks may perform a subtraction operation, whereas a second of the DSP blocks may perform an summing operation.

Further features of the invention, its nature and various advantages, will be more apparent from the accompanying drawings and the following detailed description of the preferred embodiments.

DETAILED DESCRIPTION

Embodiments herein relate to integrated circuits and, more particularly, to integrated circuits that perform normalization for floating-point arithmetic operations.

Figure 1:
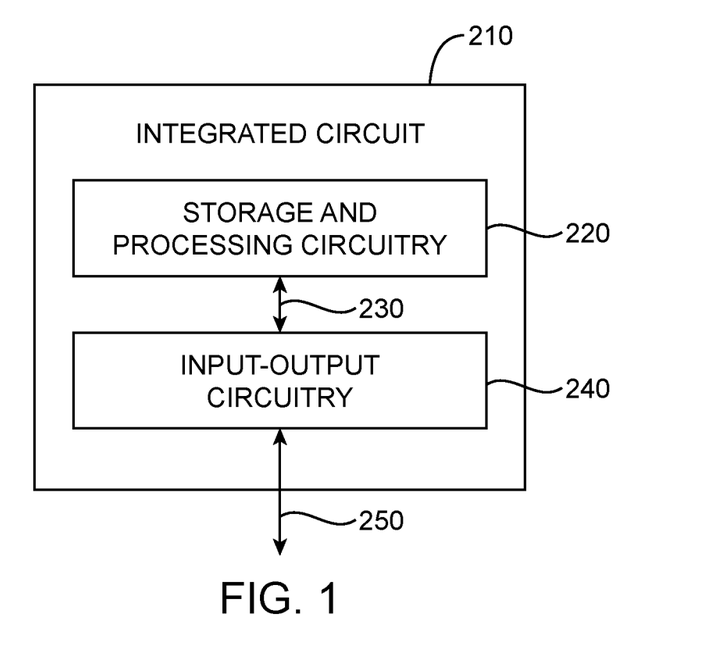
FIG. 1 is a diagram of an illustrative integrated circuit in accordance with an embodiment.

An illustrative embodiment of an integrated circuit 210 in accordance with the present invention is shown in FIG. 1. Integrated circuit 210 may include storage and processing circuitry 220 and input-output circuitry 240. Storage and processing circuitry 220 may include embedded microprocessors, digital signal processors (DSP), microcontrollers, or other processing circuitry. The storage and processing circuitry 220 may further have random-access memory (RAM), first-in first-out (FIFO) circuitry, stack or last-in first-out (LIFO) circuitry, read-only memory (ROM), or other memory elements.

Input/output circuitry may include parallel input/output circuitry, differential input/output circuitry, serial data transceiver circuitry, or other input/output circuitry suitable to transmit and receive data. Internal interconnection resources 230 such as conductive lines and busses may be used to send data from one component to another component or to broadcast data from one component to one or more other components. External interconnection resources 250 such as conductive lines and busses, optical interconnect infrastructure, or wired and wireless networks with optional intermediate switches may be used to communicate with other devices.

Floating-point numbers are commonplace for representing real numbers in scientific notation in computing systems and are designed to cover a large numeric range and diverse precision requirements. The IEEE754 standard is commonly used for floating-point numbers. A floating-point number, such as the floating-point number illustrated in FIG. 2 includes three different parts: the sign of the floating-point number 10, the mantissa 11, and the exponent 12. Each of these parts may be represented by a binary number and, in the IEEE754 format, have different bit sizes depending on the precision.

Figure 2:
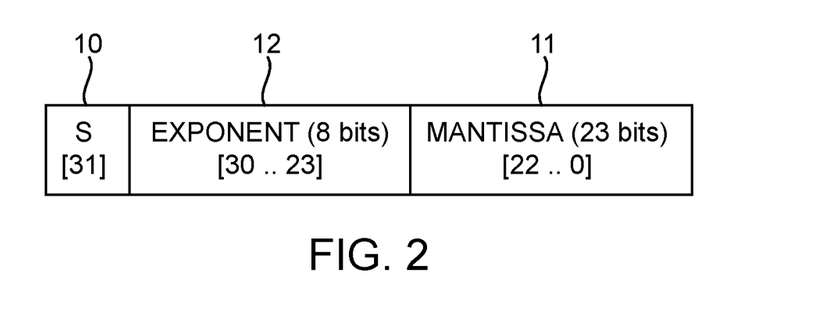
FIG. 2 is a diagram of a single precision floating-point number in accordance with an embodiment.

For example, a single precision floating-point number such as the floating-point number in FIG. 2 requires 32 bits, which are distributed as follows: one sign bit (bit 31), eight exponent bits (bits [30:23]), and 23 mantissa bits (bits [22:0]). As another example, a double precision floating-point number requires 64 bits including one sign bit (bit 63), 11 exponent bits (bits [62:52]), and 52 mantissa bits (bits [51:0]).

The sign of a floating-point number according to standard IEEE754 is represented using a single bit, where a "0" denotes a positive number and a "1" denotes a negative number. The exponent of a floating-point number preferably is an unsigned binary number which, for the single precision format, ranges from 0 to 255. In order to represent a very small number, it is necessary to use negative exponents. To achieve this, the exponent preferably has a negative bias associated with it. For single precision floating-point numbers, the bias preferably is 127. For example a value of 140 for the exponent actually represents (140−127)=13, whereas a value of 100 represents (100−127)=−27. For double precision numbers, the exponent bias preferably is 1023.

As discussed above, according to the IEEE754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

Figure 3:
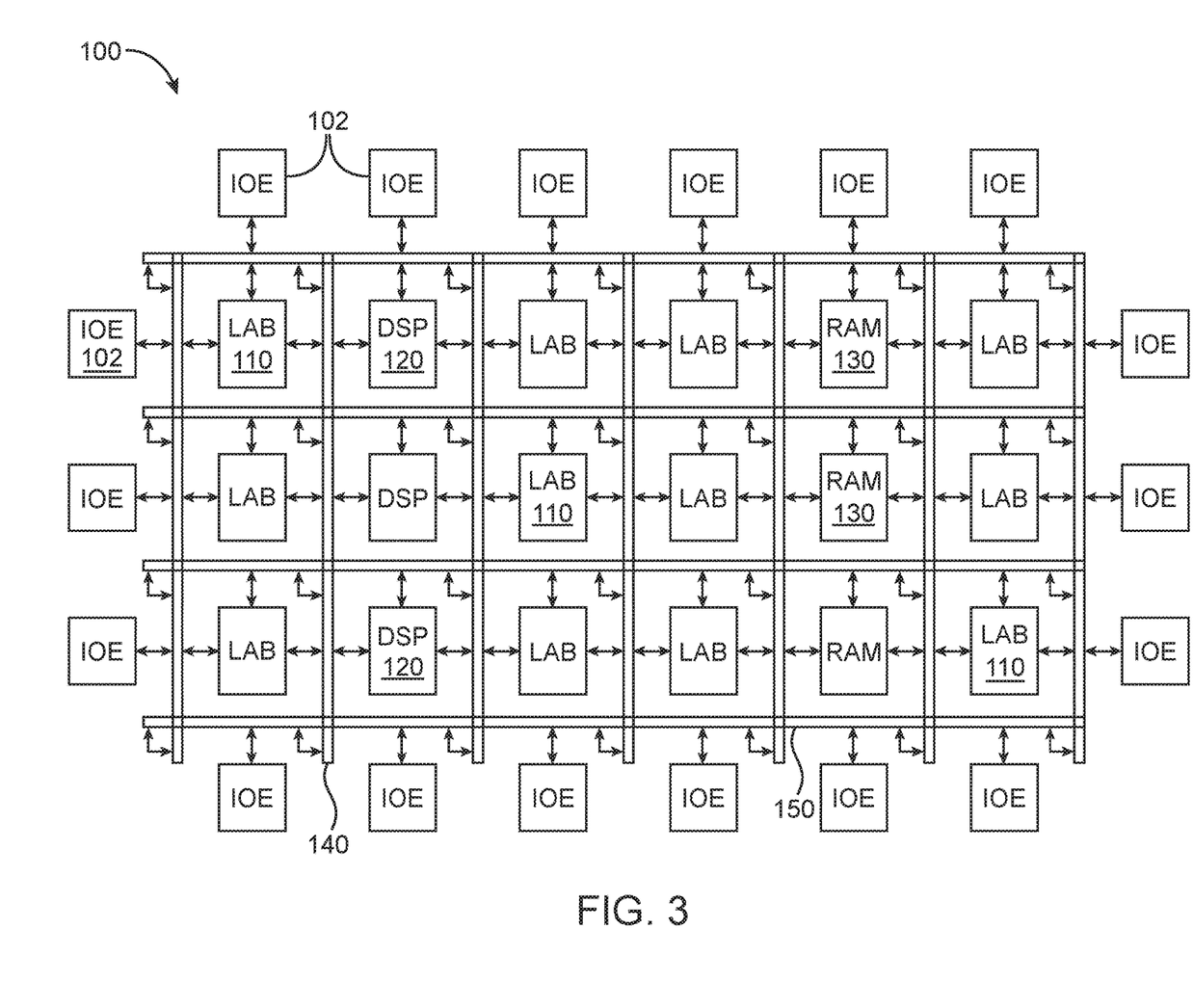
FIG. 3 is a diagram of an illustrative programmable integrated circuit in accordance with an embodiment.

In accordance with an embodiment, normalization circuitry may be implemented on a programmable integrated circuit device such as programmable logic device or "PLD" 100 (see, e.g., FIG. 3). As shown in FIG. 3, device 100 may include a two-dimensional array of functional blocks, including logic array blocks (LABs) 110 and other functional blocks, such as random access memory (RAM) blocks 130 and specialized processing blocks such as digital signal processing (DSP) blocks 120. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, DSP 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

As described above, the normalization operation may occur every time a fixed-point format is converted to a floating-point format, which is common within an internal data path for floating-point elementary functions, either for preparing a floating-point datum prior to a floating-point polynomial evaluation or for the final packing of an internal fixed-point format into a floating-point format.

The normalization problem is seemingly simple. Consider an example where a 10-bit input bit vector x="00000110011". Conventionally, a leading-zero counter will be used to count the number of leading zeros, which is equal to five in this example. Input vector x will then be shifted five positions to the left using a barrel shifter, with zeros padded to the right. The resulting normalized vector is "1100100000" with an associated count value of five. The leading-zero counter and the barrel shifter are typically implemented in soft logic and consists of multiple stages. This multi-layer structure makes these components difficult to pipeline and also challenging to place and route efficiently for high performance applications.

In accordance with an embodiment of the present invention, at least part of the normalization operation takes advantage of DSP blocks 120 within programmable integrated circuit 100 by leveraging the floating-point capabilities of these DSP blocks. DSP blocks 120 are embedded blocks on device 100 and may be partly or fully hardwired to perform one or more specific tasks, such as a logical or a mathematical operation. Examples of structures that are commonly implemented in such specialized processing blocks include floating-point multipliers, arithmetic logic units (ALUs), as well as memory elements. Leveraging the embedded floating-point resources within DSP blocks 120 can allow for a more efficient implementation of the normalization circuit (i.e., the implementation is compact with almost no logic consumption). A normalization circuit that is DSP-based can exhibit high performance and is also easy to place and route since the block size is predictable.

Figure 4:
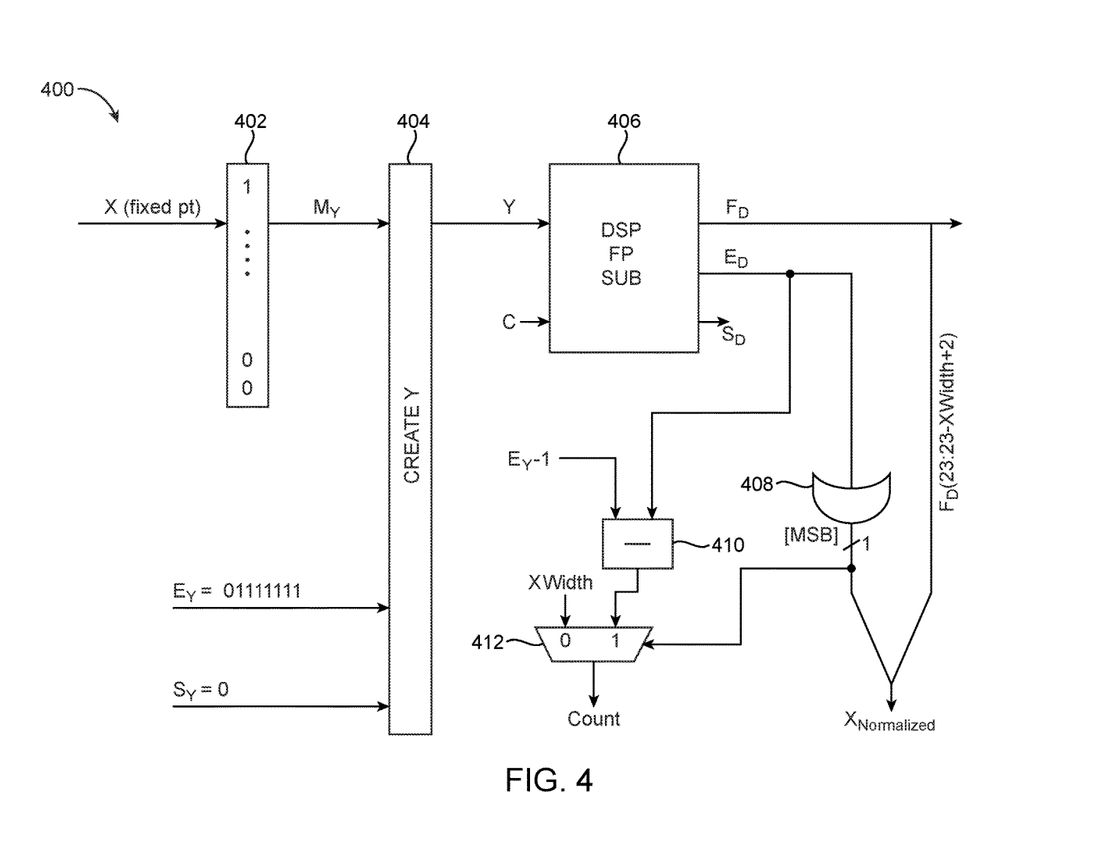
FIG. 4 is a diagram of illustrative normalization circuitry that uses one specialized processing block in accordance with an embodiment.

FIG. 4 is a diagram of illustrative normalization circuitry 400 that uses only one specialized processing block. As shown in FIG. 4, normalization circuitry 400 may include a mantissa generation circuit such as circuit 402, a floating-point number generation circuit such as circuit 404, an embedded specialized processing block such as digital signal processing (DSP) block 406, a reducing circuit such as logic OR gate 408, a constant subtraction circuit 410, and a switching circuit such as multiplexer 412.

Normalization circuitry 400 has an input that receives bit vector X, which is in fixed-point format. Circuits 402 and 404 may be configured to create a corresponding single-precision floating-point value Y, having a mantissa $M_Y$ with an added implicit leading "1" and a fractional component that is equal to X with any additional padded zeros to the right if necessary (e.g., implemented using mantissa generation circuit 402), an exponent $E_Y$ that is equal to "01111111", and a sign bit $S_Y$ that is equal to zero. Since the bias for single-precision floating-point numbers is 127, an exponent $E_Y$ of "01111111" yields an effective exponent value of zero. A sign value of zero indicates that Y is a positive number.

DSP block 406 may be configured as a floating-point subtraction circuit that receives Y and a floating-point constant C and that generates a corresponding difference value D (e.g., D=Y−C). Constant value C may have a mantissa that is equal to 1.0, an exponent that is equal to $E_Y$, and a sign that is equal to $S_Y$. Generically, D may be equal to Y−1 since C is practically equal to a one. DSP subtractor 406 may generate an output D with a mantissa with a fractional component $F_D$, an exponent $E_D$, and a sign bit $S_D$. The sign bit $S_D$ may be unused.

The normalized X may be obtained from the mantissa and exponent of difference value D. Reducing OR gate 408 may OR together all the bits of exponent $E_D$ to output the most significant bit (MSB) for the normalized output $X_{Normalized}$. The MSB acts like the implicit leading one and will be equal to a "1" as long as $E_D$ is not equal to zero. Assuming X has a width that is equal to XWidth, (XWidth−1) bits starting from the top of $F_D$ may be appended next to form final output $X_{Normalized}$.

The count value may be generated using circuits 410 and 412. Circuit 410 may be used to compute the difference between ($E_Y$−1) and $E_D$. Multiplexer 412 has a first (0) input that receives width XWidth, a second (1) input that receives the result from circuit 410, a control input that receives the MSB from circuit 408, and an output on which the count value is provided. Configured in this way, the count value will be equal to the output of circuit 410 as long as the MSB is equal to a "1". If the MSB is "0", however, the count value will be equal to XWidth.

The operation of normalization circuitry 400 is best illustrated via examples. Consider a first example in which input bit vector X has 20 bits and is equal to "00000110010000111101". Circuit 404 may then generate a corresponding Y with a sign bit equal to "0", an exponent of "01111111", and a mantissa of "1.00000110010000111101000". In this example, the mantissa will be padded with three zeros (see italicized zeros above) since the single-precision format has 23 total mantissa bits.

On the other hand, constant C may have a sign bit equal to "0", an exponent of "01111111", and a mantissa of "1.00000000000000000000000". The resulting difference D computed by DSP subtraction block 406 may therefore be equal to "0.00000110010000111101000" in fixed point, which is equivalent to "1.10010000111101000000000*2^(−6)" in floating point (fractional component underlined). To yield an effective exponent of −6, $E_D$ will be equal to 121 (i.e., 127 minus 6), which is "01111001" in binary. The final normalized X can then be extracted from the upper 19 bits of the fractional component emphasized above. The MSB generated by gate 408 is equal to "1" since $E_D$ is non-zero. As a result, $X_{Normalized}$ will be equal to "1100100001111101000000". Since the MSB is high, the count at the output of multiplexer 412 will be equal to [($E_Y$−1)−$E_D$], which is [(127−1)−121]=5, which yields the correct number of leading zeros.

Consider a second example in which input bit vector X has 20 bits and is equal to "00000000000000000001". Circuit 404 may then generate a corresponding Y with a sign bit equal to "0", an exponent of "01111111", and a mantissa of "1. 00000000000000000001000". In this example, the mantissa will be padded with three zeros (see italicized zeros above) since the single-precision format has 23 total mantissa bits.

On the other hand, constant C may have a sign bit equal to "0", an exponent of "01111111", and a mantissa of "1.00000000000000000000000". The resulting difference D computed by DSP subtraction block 406 may therefore be equal to "0.00000000000000000001000" in fixed point, which is equivalent to "1. 00000000000000000000000*2^(−20)" in floating point (fractional component underlined). To yield an effective exponent of −20, $E_D$ will be equal to 107 (i.e., 127 minus 20), which is "01101011" in binary. The final normalized X can then be extracted from the upper 19 bits of the fractional component emphasized above. The MSB generated by gate 408 is equal to "1" since $E_D$ is non-zero. As a result, $X_{Normalized}$ will be equal to "10000000000000000000". Since the MSB is high, the count at the output of multiplexer 412 will be equal to [($E_Y$−1)−$E_D$], which is [(127−1)−107] =19, which yields the correct number of leading zeros.

Consider another edge case in which input bit vector X has 20 bits and is equal to "00000000000000000000" (i.e., X is all zeros). Circuit 404 may then generate a corresponding Y with a sign bit equal to "0", an exponent of "01111111", and a mantissa of "1. 00000000000000000000000". In this example, the mantissa will be padded with three zeros (see italicized zeros above) since the single-precision format has 23 total mantissa bits.

On the other hand, constant C may have a sign bit equal to "0", an exponent of "01111111", and a mantissa of "1.00000000000000000000000". The resulting difference D computed by DSP subtraction block 406 may therefore be equal to zero or "0.00000000000000000000000" in fixed point, which can be encoded in floating-point as a number with an exponent of all zeros "00000000" and a fraction with all zeros "00000000000000000000000". The final normalized X can then be extracted from the upper 19 bits of the fractional component, which is all zeros in this scenario. The MSB generated by gate 408 is equal to "0" since $E_D$ is all zeros. As a result, $X_{Normalized}$ will be equal to "00000000000000000000". Since the MSB is low, the count at the output of multiplexer 412 will be equal to XWidth, which is 20 in this particular example.

Figure 5:
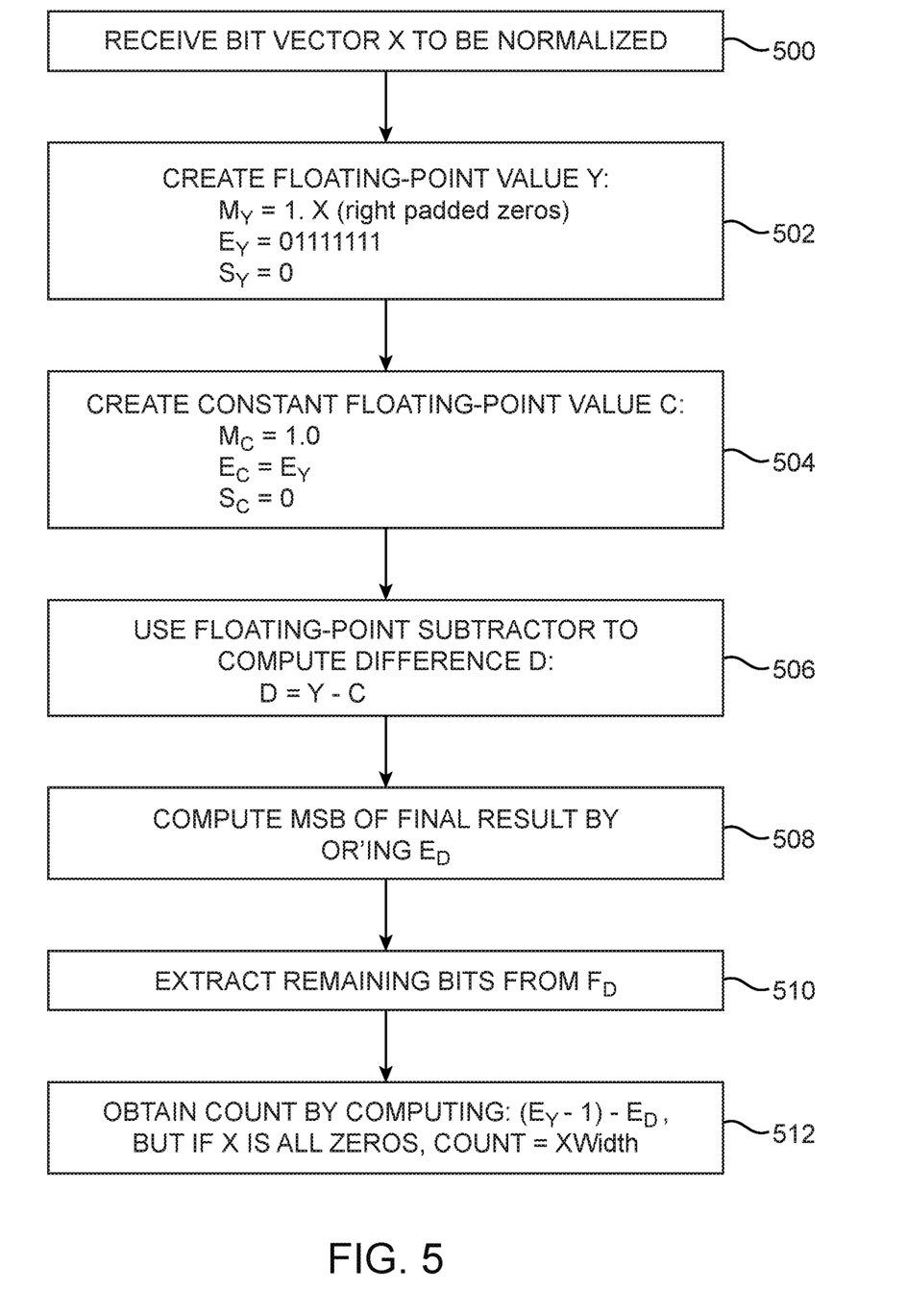
FIG. 5 is a flow chart of illustrative steps for operating the normalization circuitry shown in FIG. 4 in accordance with an embodiment.

FIG. 5 is a flow chart of illustrative steps for operating normalization circuitry 400. At step 500, circuitry 400 may receive input bit vector X. At step 502, circuits 402 and 404 may be used to create floating-point value Y, where mantissa $M_Y$ is equal to 1.X right padded with zeros until 23 mantissa bits are filled, exponent $E_Y$ is equal to $127_{10}$, and sign bit $S_Y$ is equal to zero.

At step 504, a single-precision constant value C with mantissa $M_C$ of 1.0 (e.g., a mantissa with 23 fractional zero bits), exponent $E_C$ equal to $E_Y$, and sign bit $S_C$ equal to zero is provided to DSP block 406. Since C is a constant value, it may be a predetermined value that is hardwired as long as $E_Y$ and $S_Y$ stay constant.

At step 506, DSP floating-point subtractor 406 may then compute difference D by subtracting C from Y. Difference D may have exponent $E_D$, mantissa $M_D$ with a fractional portion $F_D$ (where $M_D$=1.$F_D$), and sign bit $S_D$.

At step 508, reducing circuit 408 may compute the MSB of the final result by OR'ing the bits of $E_D$. The resulting MSB of $X_{Normalized}$ is high if any of bits in $E_D$ is high and is low only if all of the bits in $E_D$ is zero (i.e., the MSB is equal to "0" when X is all zeros).

At step 510, the remaining bits of $X_{Normalized}$ may be extracted from fractional portion $F_D$. For example, the top (XWidth−1) bits from $F_D$ may represent the remaining bits of $X_{Normalized}$. If X has 13 bits, then only the 12 most significant bits of $F_D$ will be used. If X has 18 bits, then only the 17 upper bits of $F_D$ will be used.

At step 512, the count value associated with $X_{Normalized}$ may be obtained by computing $[(E_Y−1)−E_D]$ using circuit 410. However, if X is all zeros, the final MSB at the output of gate 408 will be low, which will instead configure count to be equal to XWidth.

The embodiments described in connection with FIGS. 4 and 5 involve using only one DSP block to perform a single-precision subtraction operation and thus will support normalizing an input bit vector X of up to 23 bits. The techniques described herein may also be extended to support input bit vectors having more than 23 bits.

Figure 6:
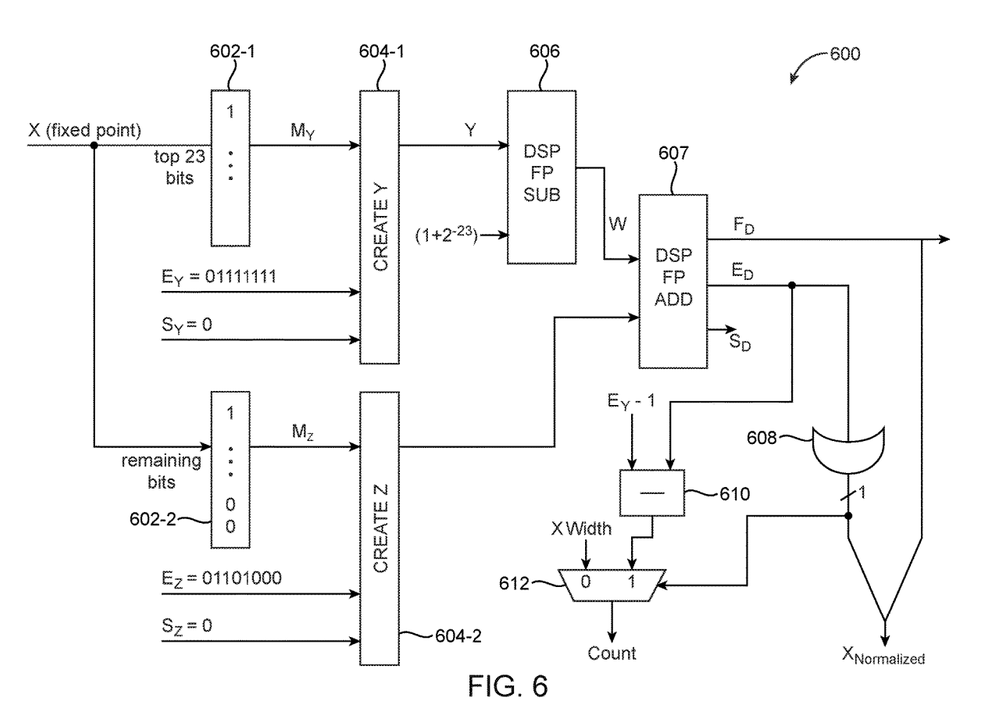
FIG. 6 is a diagram of illustrative normalization circuitry that uses two specialized processing blocks in accordance with an embodiment.

FIG. 6 is a diagram of illustrative normalization circuitry 600 that uses two specialized processing blocks to supporting normalizing vector X having XWidth>23. As shown in FIG. 6, normalization circuitry 600 may include a first mantissa generation circuit 602-1, a second mantissa generation circuit 602-1, a first floating-point number generation circuit 604-1, a second floating-point number generation circuit 604-2, a first DSP block 606, a second DSP block 607, a reducing OR circuit 608, a constant subtraction circuit 610, and a multiplexing circuit 612.

Normalization circuitry 600 has an input that receives bit vector X (with more than 23 bits), which is in fixed-point format. Circuits 602-1 and 604-1 may be configured to create a first corresponding single-precision floating-point value Y having a mantissa $M_Y$ with an added implicit leading "1" and a fractional component that is equal to the upper 23 bits of X (e.g., implemented using mantissa extraction/generation circuit 602-1), an exponent $E_Y$ that is equal to "01111111" (or 127, which negates the 127 bias), and a sign bit $S_Y$ that is equal to zero.

Moreover, circuits 602-2 and 604-2 may be configured to create a first corresponding single-precision floating-point value Z having a mantissa $M_Z$ with an added implicit leading "1" and a fractional component that is equal to the remaining bits of X optionally right padded with zeros—assuming X is also less than or equal to 46 bits (e.g., implemented using mantissa generation circuit 602-2), an exponent $E_Z$, and a sign bit $S_Z$ that is equal to zero. Since Z represents bit values after the 23 position in X, $E_Z$ will have an exponent that is equal to (127−23)=104, which is equivalent to "01101000" in binary format.

DSP block 606 may be configured as a floating-point subtraction circuit that receives Y and a floating-point constant C'=(1+2^−23) and that generates a corresponding difference value W (e.g., W=Y−C'). The "1" term in constant C' serves to cancel out the implied leading one in Y, whereas the "2^−23" term in constant C' serves to cancel out the implied leading one in Z.

On the other hand, DSP block 607 may be configured as a floating-point addition circuit that adds together W and Z to generate a corresponding sum output D (e.g., D=W+Z). Output D may have a mantissa with a fractional component $F_D$, an exponent $E_D$, and a sign bit $S_D$. The sign bit $S_D$ may be unused.

The normalized X may be obtained from the mantissa and exponent of difference value D. Reducing OR gate 608 may OR together all the bits of exponent $E_D$ to output the most significant bit (MSB) for the normalized output $X_{Normalized}$. The MSB acts like the implicit leading one and will be equal to a "1" as long as $E_D$ is not equal to zero. Assuming X has a width that is equal to XWidth, (XWidth−1) bits starting from the top of $F_D$ may be appended next to form final output $X_{Normalized}$, where XWidth is assumed to be greater than 23. For the dual-DSP implementation, the output width can be at most the fraction bit width plus one. For single precision floating-point numbers, the output width can be at most (23+1). Therefore, the 2-DSP normalization circuitry can receive 46 bits, but can only return 24 useful bits.

The count value may be generated using circuits 610 and 612. Circuit 610 may be used to compute the difference between ($E_Y$−1) and $E_D$. Multiplexer 412 has a first (0) input that receives width XWidth, a second (1) input that receives the result from circuit 610, a control input that receives the MSB from circuit 608, and an output on which the count value is provided. Configured in this way, the count value will be equal to the output of circuit 610 as long as the MSB is equal to a "1". If the MSB is "0", however, the count value will be equal to XWidth.

The operation of normalization circuitry 600 is best illustrated via an example. Consider an scenario in which input bit vector X has 41 bits and is equal to "00000000001111010101010101010101010101001". Circuits 602-1 and 604-1 may extract the upper 23 bits and inject a leading one to generate first floating-point value Y with $E_Y$ equal to $127_{10}$ and $S_Y$ equal to zero. Circuits 602-2 and 604-2 may extract the remaining lower bits (and optionally right pad with zeros for a total of 23 bits) and also inject a leading one to generate second floating-point value Z with $E_Z$ equal to $104_{10}$ and $S_Z$ equal to zero. The injected leading one in Z's mantissa has the same weight as the least significant bit (LSB) of the mantissa of Y.

Like the previous embodiment of FIGS. 4 and 5, the final D value may be obtained by computing the difference between the derived floating-point values and their associated leading one. Thus, it may be desirable to compute:

$$D = (Y-1) + (Z - 2^{-23}) \quad (1)$$

By grouping the constants together, the expression then becomes:

$$D = (Y - (1 + 2^{-23})) + Z \quad (2)$$

The subtraction operation in equation 2 can be carried out using DSP floating-point subtraction circuit 606, whereas the addition operation may be carried out using DSP floating-point subtraction circuit 607 (see FIG. 6). This procedure can be repeated recursively. The final output $X_{Normalized}$ can be obtained as described above from $F_D$ and $E_D$ (e.g., using circuits 608, 610, and 612).

Figure 7:
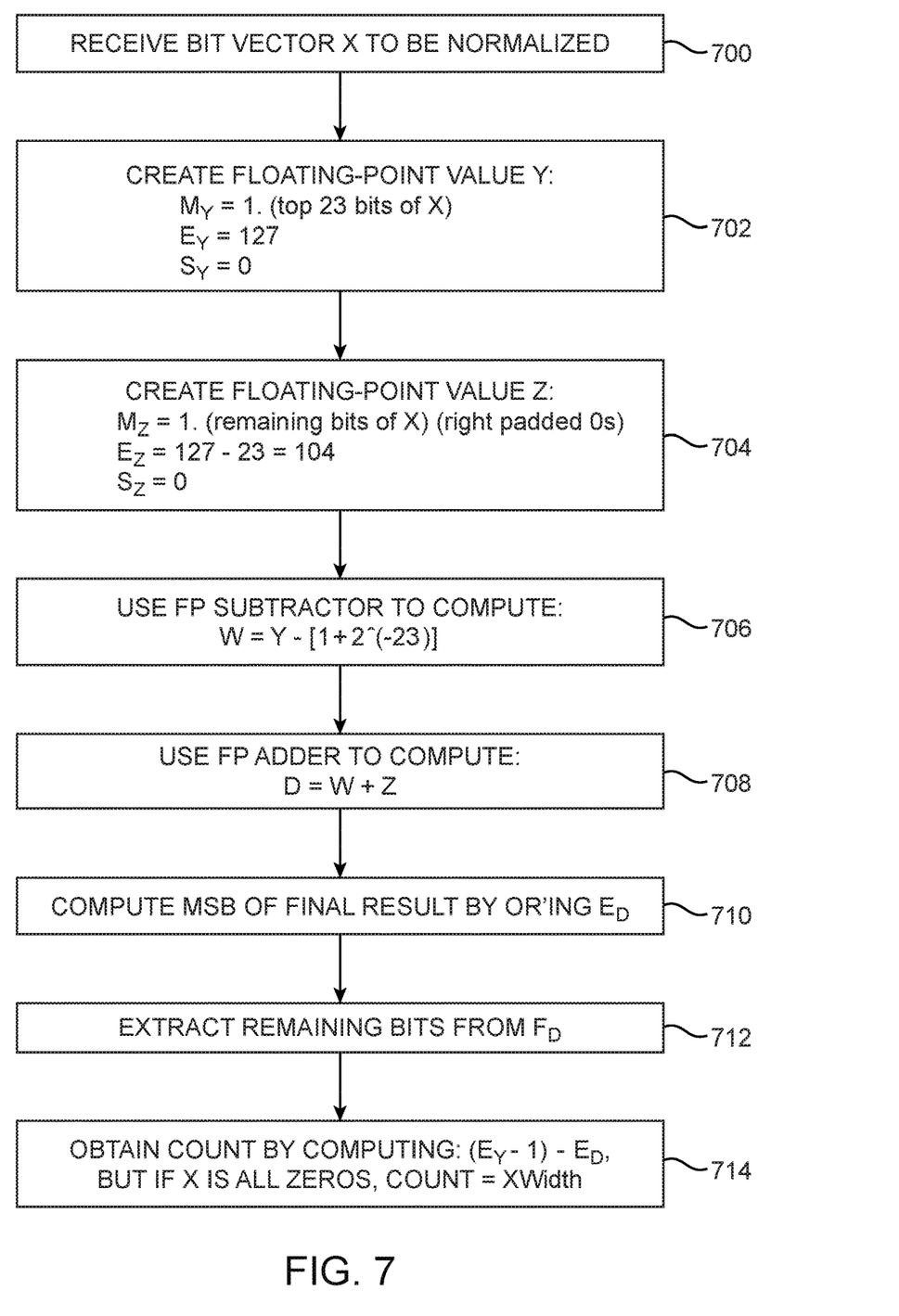
FIG. 7 is a flow chart of illustrative steps for operating the normalization circuitry shown in FIG. 6 in accordance with an embodiment.

FIG. 7 is a flow chart of illustrative steps for operating normalization circuitry 600. At step 700, circuitry 600 may receive input bit vector X to be normalized.

At step 702, circuits 602-1 and 604-1 may be used to create floating-point value Y, where mantissa $M_Y$ is equal to 1·(top 23 bits of X), exponent $E_Y$ is equal to $127_{10}$, and sign bit $S_Y$ is equal to zero.

At step 704, circuits 602-2 and 604-2 may be used to create floating-point value Z, where mantissa $M_Z$ is equal to 1·(remaining bits of X) right padded with zeros until 23 mantissa bits are occupied, exponent $E_Z$ is equal to $104_{10}$, and sign bit $S_Z$ is equal to zero.

At step 706, DSP floating-point subtractor 606 may then compute difference W by subtracting [1+2^(−23)] from Y. At step 708, DSP floating-point adder 607 may then compute sum D by adding W and Z. Sum D may have exponent $E_D$, mantissa $M_D$ with a fractional portion $F_D$ (where $M_D = 1.F_D$), and sign bit $S_D$.

At step 710, reducing circuit 608 may compute the MSB of the final result by OR'ing the bits of $E_D$. The resulting MSB of $X_{Normalized}$ is high if any of bits in $E_D$ is high and is low only if all of the bits in $E_D$ is zero (i.e., the MSB is equal to "0" when X is all zeros).

At step 712, the remaining bits of $X_{Normalized}$ may be extracted from fractional portion $F_D$.

At step 714, the count value associated with $X_{Normalized}$ may be obtained by computing $[(E_Y-1)-E_D]$ using circuit 610. However, if X is all zeros, the final MSB at the output of gate 608 will be low, which will instead configure count to be equal to XWidth.

These steps are merely illustrative and are not intended to limit the scope of the present embodiments. The existing steps may be modified or omitted; some of the steps may be performed in parallel; additional steps may be added; and the order of certain steps may be reversed or altered. If desired, the approach described above may be extended to normalize bit vectors with more than 46 bits using two or more floating-point DSP blocks, etc. Moreover, rounding operations may be embedded if used in floating-point context on single-precision functions. If desired, exponent update functions may also be embedded by properly adjusting $E_Y$ (e.g., the exponent of Y and/or Z may have other suitable values depending on the desired base exponent).

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/INTEL Corporation.

The foregoing is merely illustrative of the principles of this invention and various modifications can be made by those skilled in the art. The foregoing embodiments may be implemented individually or in any combination.

What is claimed is:

1. An integrated circuit, comprising:
an input that receives a fixed-point number;
a floating-point generation circuit that creates a floating-point number based on the fixed-point number;
a digital signal processing block that computes a difference between the floating-point number and a constant, wherein the digital signal processing block has a first output on which a fractional component of the difference is generated and a second output on which an exponent of the difference is generated;
a logic gate having an input configured to receive the exponent of the difference and an output at which a bit is generated; and
wires for combining the bit generated from the logic gate with at least a portion of the fractional component of the difference generated at the first output of the digital signal processing block to obtain a normalized version of the fixed-point number.

2. The integrated circuit of claim 1, wherein the constant has a mantissa that is equal to one.

3. The integrated circuit of claim 1, wherein the floating-point number and the constant have the same exponent value.

4. The integrated circuit of claim 1, wherein the floating-point number and the constant have the same sign value.

5. The integrated circuit of claim 1, further comprising:
a mantissa generation circuit that receives the fixed-point number and that generates a mantissa for the floating-point number by inserting a leading one in front of the fixed-point number and by optionally padding the fixed-point number with zeros, wherein the mantissa generation circuit is coupled between the input and the floating-point generation circuit.

6. The integrated circuit of claim 1, wherein the logic gate comprises a reducing OR circuit that generates a most significant bit (MSB) for the normalized version of the fixed-point number.

7. The integrated circuit of claim 6, further comprising:
a subtraction circuit that receives an exponent of the floating-point number and the exponent of the difference and that generates an output.

8. The integrated circuit of claim 7, further comprising:
a multiplexer having a first input that receives a width of the fixed-point number, a second input that receives the output from the subtraction circuit, a control input that is controlled by the MSB, and an output on which a count value associated with the normalized version of the fixed-point number is provided.

9. The integrated circuit of claim 1, further comprising:
an additional floating-point generation circuit that creates another floating-point number based on the fixed-point number.

10. The integrated circuit of claim 9, further comprising:
an additional digital signal processing block that computes a sum of the difference and the another floating point number, wherein the sum is used to obtain the normalized version of the fixed-point number.

11. A method of operating an integrated circuit, comprising:
receiving a fixed-point number;
with a floating-point generation circuit on the integrated circuit, creating a floating-point number from the fixed-point number;
with a digital signal processing block on the integrated circuit, performing an arithmetic operation on the floating-point number to obtain a result, wherein performing the arithmetic operation comprises computing a difference between the floating-point number and a constant, wherein a fractional component of the difference is provided on a first output of the digital signal processing block, and wherein an exponent of the difference is provided on a second output of the digital signal processing block; and with a reducing circuit on the integrated circuit, receiving the exponent of the difference from the second output of the digital signal processing block and generating a corresponding output bit;

with wiring circuitry on the integrated circuit, combining the output bit generated from the reducing circuit with at least a portion of the fractional component of the difference from the first output of the digital signal processing block to generate a normalized version of the fixed-point number.

12. The method of claim 11, wherein the output bit generated by the reducing circuit represents the most significant bit (MSB) for the normalized version of the fixed-point number.

13. The method of claim 12, wherein the floating-point number has an exponent, the method further comprising:

with a subtraction circuit, receiving the exponent of the floating-point number and the exponent of the difference and generating a corresponding output signal.

14. The method of claim 13, wherein the fixed-point number has a width, the method further comprising:

with a switching circuit, receiving the width at a first input of the switching circuit;

receiving the output signal from the subtraction circuit at a second input of the switching circuit;

receiving the MSB from the reducing circuit at a control input of the switching circuit; and with the switching circuit, generating a count value associated with the normalized version of the fixed-point number.

15. Normalization circuitry, comprising:

an input that receives a fixed-point number;

a floating-point generation circuit that creates a floating-point number based on the received fixed-point number;

a floating-point subtraction circuit having a first input configured to receive the floating-point number from the floating-point generation circuit, a second input configured to receive a constant number, a first output on which a fractional component of a difference of the floating-point number and the constant number is computed, a second output on which an exponent value of the difference is computed;

a logic OR gate configured to receive the exponent value from the second output of the floating-point subtraction circuit; and an output that is directly connected to the logic OR gate and the first output of the floating-point subtraction circuit, wherein a normalized version of the fixed-point number is provided at the output.

16. The normalization circuitry of claim 15, wherein the logic OR gate is configured to generate a most significant bit (MSB) for the normalized version of the fixed-point number.

17. The normalization circuitry of claim 15, further comprising:

an additional floating-point generation circuit that creates another floating-point number, wherein the floating-point number is created based on a first subset of the fixed-point number, and wherein the another floating-point number is created based on a second subset of the fixed-point number that is different than the first subset.

18. The normalization circuitry of claim 15, further comprising:

an additional digital signal processing (DSP) block that is coupled between the floating-point generation circuit and the DSP block.

* * * * *